UNITED STATES PATENT OFFICE.

CALVIN B. LAWRENCE, OF NUNDA, NEW YORK.

IMPROVEMENT IN METALLIC LUBRICATING COMPOSITIONS.

Specification forming part of Letters Patent No. 33,438, dated October 8, 1861.

*To all whom it may concern:*

Be it known that I, CALVIN B. LAWRENCE, of the town of Nunda, in the county of Livingston, State of New York, have invented a new and useful compound for lubricating car-axles, shafting, and all other machinery fitted to run or slide in boxes; and I do hereby declare that the following is a clear, full, and exact description of the same.

My invention consists in mixing regulous of antimony, finely pulverized, in about equal parts, with any kind of animal, vegetable, or mineral oil, by which it forms a body of about the consistence of paste, which is suitable to be applied to axles or shafting running in metal boxes, or pistons having metallic packing. It may be diluted by adding thin oil of any kind, and brought into a fluid state, so as to flow freely from a can or oiler and work into close-fitting boxes, or those that have become tight by the heating and expanding of the axles or shafts.

It is a peculiar property of this compound that it will not allow the bearings to heat; but when applied to bearings that have already become heated by the friction it will immediately cool them off and prevent any further liability to heat while there is any of the compound lubricating substance on the parts. I am fully satisfied, from actual experiment and many thorough practical demonstrations, that there is a most singular chemical effect produced by the application of antimony to the finished surfaces of steel and other metals. It seems to fill all of the pores and leaves a perfectly-polished enamel where the parts come in contact with each other. It will also remove all of the gum and sticky substance from the bearings caused by bad or burned oil. It has a most peculiar effect when applied to oil-stones, in cleaning the surface so that it will take hold of the steel, and is of itself a very superior paste for razor-strops.

Having thus set forth the nature and object of my invention, I will proceed to state what I desire to secure by Letters Patent.

I do not confine myself to any given proportions of the ingredients; but

I claim—

The combination of antimony with any oleaginous substance, substantially as set forth, and for the purposes specified.

CALVIN B. LAWRENCE.

Witnesses:
EDM. F. BROWN,
J. B. WOODRUFF.